Figure 1:
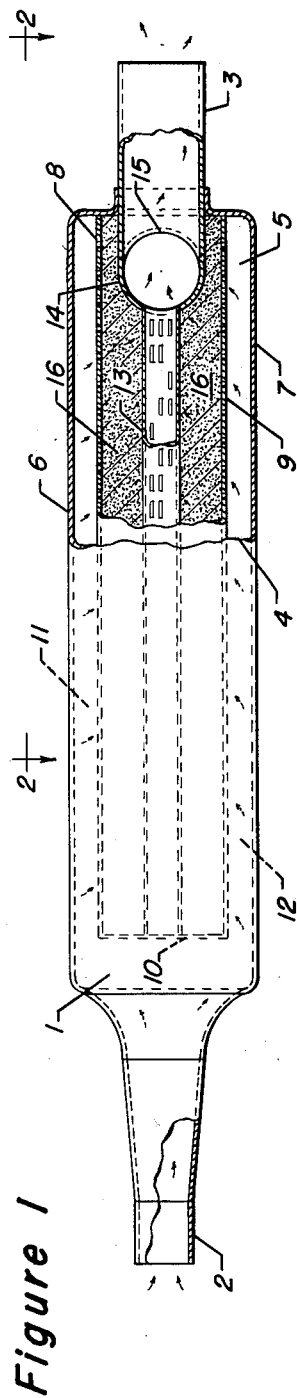

Dec. 3, 1963

C. G. GERHOLD 3,113,000

CATALYTIC CONVERTER-MUFFLER

Filed June 29, 1961

INVENTOR:
Clarence G. Gerhold

BY: Chester J. Giuliani
Philip T. Liggett
ATTORNEYS

United States Patent Office 3,113,000
Patented Dec. 3, 1963

3,113,000
CATALYTIC CONVERTER-MUFFLER
Clarence G. Gerhold, Palatine, Ill., assignor to Universal Oil Products Company, Des Plaines, Ill., a corporation of Delaware
Filed June 29, 1961, Ser. No. 120,649
3 Claims. (Cl. 23—288)

The present invention relates to an improved type of catalytic converter or muffler suitable for the treatment of exhaust gas streams. The apparatus is particularly constructed and designed to hold and utilize a fixed bed of catalyst or other contact material, such that there is a resulting uniform balanced flow of exhaust gases into and through the bed of material without encountering the usual difficulties of plugging from settled finely divided particles.

Exhaust gases from vehicles contain one or more components as unburned hydrocarbons, carbon monoxide, nitrogen oxides, sulfur compounds, partially oxidized products, etc., in various concentrations, and part or all of these components contribute to the smog problem presently facing various sections of the United States and other countries. Thus, the necessity of removing or converting the noxious compounds from engine exhaust gas streams is generally recognized. The exhaust gas stream from an engine may be treated by the use of an "afterburner" which effects the thermal conversion of oxidizable components, or with the use of a catalytic converter device which utilizes a catalytic material to assist in effecting the lowering of temperatures at which oxidation may be carried out and the increased efficiency of conversion of the oxidizable components.

The present converter-muffler provides improved flow characteristics over conventional types of mufflers or converters which are designed to effect either an upward and/or downward flow through a catalyst bed, or alternatively, which may use an annular shaped bed with radial flow therethrough. In an upward flow through a catalytic converter, the up flowing gas stream tends to fluidize the bed of contact material and cause agitation which in turn leads to breakage of catalyst into undesired fines that may be lost from the system. On the other hand, a downward gas flow through a stationary bed tends to have problems from plugging and reduced velocity. In other words, finely divided particles which are formed from the bed of catalyst will tend to settle to the bottom of the conversion zone during the continued operation of the vehicle and as a result plug the outlet openings in the lower portion of the contact bed and reduce or stop entirely the downward gas flow through the bed. Radial flow designs generally require more expensive cylindrically-shaped chambers and internal annularly shaped catalyst retaining sections and frequently, because of space requirements, they are more difficult to install in a vehicle than a generally flat rectangular configuration.

It is a principal object of the present invention to provide a generally flat rectangular design which has a centrally positioned gas outlet means and which permits the use of both an upward flow and a downward flow through the unit whereby the catalyst bed in effect floats between opposing inlet screens under a balanced pressure condition regardless of flow rates.

It is also a principal object of the present invention to provide a converter design which substantially obviates the problem of plugging by virtue of finely divided particles settling to the lower portion thereof and stopping gas flow through the unit.

It is a still further object of the present invention to provide a catalyst retaining section which, by virtue of an opposing balanced flow therethrough, permits the use of at least two different types and sizes of catalytic material in the catalyst retaining section and insures that there will be continued optimum positioning of the different catalysts in the bed.

The principal feature of the improved apparatus is the use of a bank of perforate pipes or tubular members positioned within the central portion of the catalyst retaining chamber. The bank of tubes is spread substantially uniformly across the width and length of the catalyst section, as well as in the mid-portion thereof, such that exhaust gas stream flow which enters the catalyst retaining section will flow downwardly through that portion of the catalyst which lies above the bank of tubes and upwardly through that portion of the catalyst which lies below the bank of tubes. The perforate tube members may connect with a suitable outlet header which in turn connects with a gas outlet means from the converter housing. In order to obtain the desired balanced flow of the gas stream into and through the conversion zone, the catalyst retaining section is placed symmetrically within an exterior chamber or housing that in turn has gas inlet means arranged to uniformly divide and distribute gas to opposing perforate faces of the catalyst retaining section.

In a broad aspect, the present improved apparatus providing for the treatment of exhaust gases, comprises in combination, a substantially rectangularly-shaped outer housing having gas inlet means at one end thereof and gas outlet means at the opposing end thereof, an inner perforate particle retaining chamber disposed symmetrically within said housing and having opposing perforate walls of the housing to thereby provide a uniform gas flow to two sides of the particle retaining chamber, a bank of a plurality of perforate gas collecting pipes positioned in a relatively close parallel relationship and extending across the central portion of the inner particle retaining chamber whereby subdivided particles may be positioned uniformly each side thereof, each of the pipes of said plurality thereof connecting with a header, said header extending laterally across the end portion of the inner particle retaining chamber and having an outlet port therefrom connecting with the gas outlet means from the housing.

In a preferable construction, the apparatus is made relatively flat and rectangular, with the length and breadth being substantially large as compared with the height of the unit. The inner catalyst retaining section may be formed by positioning two spaced perforate plates across the width of the outer housing in a manner such that both spaced plates are in turn positioned a uniform or symmetrical distance away from the opposing top and bottom portions of the outer housing. Thus, by having suitable gas inlet means at the end of the housing together with means for deflecting the gas flow into separate manifold sections, there is provided a uniform gas flow into the catalyst retaining section. A half portion of the gas flow passes through the upper portion of the catalyst section and flows downwardly therethrough, while the remaining portion of the gas flow passes upwardly through the lower half of the catalyst retaining section. The plurality of perforate pipes or tubes positioned within the catalyst retaining section will have closed upstream ends, or connect with a non-perforate end portion of the catalyst retaining section, such that all of the gas flow necessarily passes through the perforations in their walls and to a header at the downstream ends of such tubes. The gas collecting header may be a separate enlarged non-perforate tube extending laterally across the downstream end of the catalyst retaining section, or alternatively, may comprise an end portion of the catalyst retaining section formed by a lateral partitioning plate which separates the header zone from the catalyst section. Since the gas flow through the bed is downward through the top section and upward through the bottom section, the bed itself tends to float between the perforate top and bottom portions of the catalyst section under a balanced pressure condition, and there is no resulting major pressure drop across one of the screens regardless of flow rates. Where there is some breakage of catalyst particles and an accumulation of finely divided material, such material will tend to settle to the lower portion of the catalyst retaining section and away from the exterior face of the perforate gas outlet tubes so that there is no plugging of flow through said tubes which would result in a high pressure drop. On the other hand the upward flow of a part of the exhaust gas stream through the lower portion of the catalyst bed is not unduly restricted by settlement of finely divided material in the catalyst section.

In an alternative design of the converter-muffler which is of advantage in reducing the effects of "velocity head" in both the inlet and outlet manifold sections, provision is made by the use of sloping wall arrangements to effect a uniform gas flow through the catalyst bed and through the unit. In other words, modification is made within the inlet manifold sections and/or the outlet manifold zone such that the static pressure within the manifold sections shall be substantially uniform and the driving force across the catalyst bed at any point therein independent of the gas inlet or outlet effects. An improved catalytic converter-muffler providing for such elimination of velocity head effects may comprise in combination, a relatively flat outer housing having a gas inlet means at one end thereof and a gas outlet means at the opposing end thereof, at least one pair of perforate partitioning plates spaced apart and positioned within said housing and forming a catalyst retaining section therein, each of said plates of said pair being positioned at a sloping non-parallel relationship with respect to an adjacent and opposing wall section of said housing, with said sloping positioning forming resulting similar and opposing manifold sections, each such section having a variable cross sectional area throughout the length thereof adjacent each side of said catalyst retaining section, a bank or plurality of perforate wall tubes positioned in a parallel relationship with one another and extending across the central interior portion of said catalyst retaining section, with such tubes having exterior walls shaped to have segments thereof extend substantially parallel with the pair of spaced perforate plates whereby catalyst is positioned in a uniform depth each side of said bank of tubes in said catalyst section, each of the tubes of said plurality connecting with a gas header extending laterally across the end of the catalyst retaining section, and said header connecting with the gas outlet means from said housing.

The variable area manifolds within the housing may be formed by utilizing a wedge shaped outer housing and a substantially flat rectangularly shaped inner catalyst retaining section with parallel faces whereby the manifold sections decrease in cross sectional area as the sloping walls of the outer housing reduce in size to meet with the catalyst retaining section. Alternatively, the housing may be of a conventional substantially uniform lateral cross section with parallel opposing walls and the interior catalyst retaining section formed from perforate plate sections which are positioned in a tapering manner with respect to their adjacent housing walls to likewise provide manifold sections with a varying cross sectional area in the longitudinal direction.

In an embodiment which utilizes the tapering or slanting perforate walls in forming the catalyst retaining section, it is then necessary to in turn utilize perforate tubular members in the central portion thereof, which likewise have tapering or sloping wall constructions such that the portions of catalyst within the catalyst retaining section on each side of the bank of tubes will have a uniform depth and whereby the pressure drop through each side of the catalyst bed is substantially equivalent and uniform.

Reference to the accompanying drawing and the following description thereof will serve to better explain and clarify the construction and design of the converter-muffler of the present invention.

FIGURE 1 of the drawing is an elevational view, partially in section, of one embodiment of the improved converter-muffler design.

Figure 2:
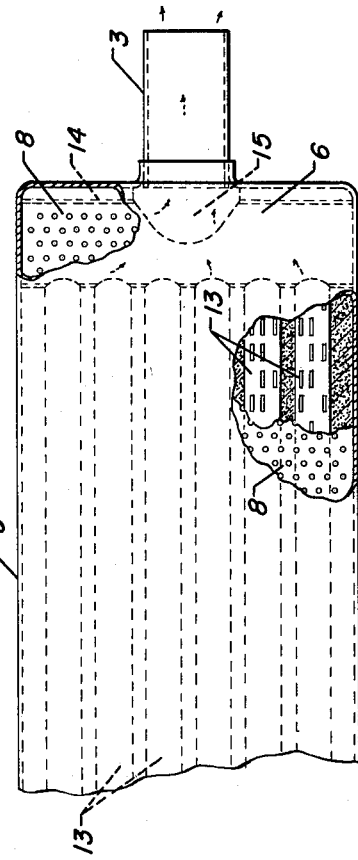

FIGURE 2 of the drawing is a partial plan view of the embodiment of FIGURE 1, as indicated by the line 2—2 in FIGURE 1.

Figure 3:
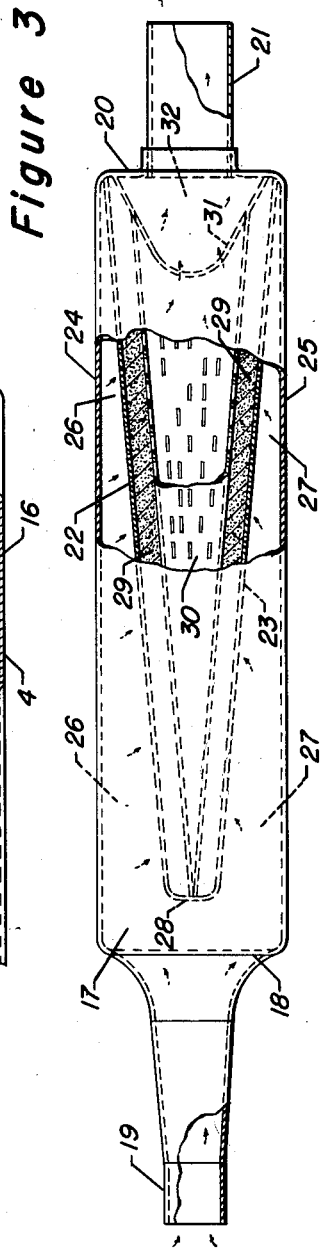

FIGURE 3 of the drawing indicates a modified construction and design which provides for longitudinally tapering manifold sections to in turn provide improved uniform flow through the conversion zone of the apparatus.

Referring now to FIGURES 1 and 2 of the drawing, there is shown an outer housing 1 having an inlet nozzle 2 connecting to one end thereof and an outlet nozzle 3 connecting at the opposing end thereof. The housing 1, in the present embodiment, is of a generally flat rectangular box-like construction having side walls 4 and 5, a top 6 and a bottom 7. An upper screen or perforate plate 8, together with a lower screen or perforate plate 9 extend in a spaced relationship laterally across the interior of the housing 1 between the side walls 4 and 5 so as to provide a confined catalyst retaining section for a bed of catalyst particles 16 which has a generally rectangular lateral cross section. A wall or partition 10 likewise extends across the interior of the housing between side walls 4 and 5 and between the ends of perforate members 8 and 9 so as to enclose the up stream end portion of the catalyst retaining section. Plate 10 is of a non-perforate construction and is positioned inside of the housing 1 away from the inlet opening a sufficient distance to permit gas flow to each side of the catalyst retaining section. Plates 8 and 9 are spaced equidistantly away from the respective walls 6 and 7 in order to provide uniformly sized gas manifold sections 11 and 12.

Within the mid portion of the catalyst retaining section between plates 8 and 9 is positioned a bank of tubular members 13 which have perforate walls, or are of a screen-like nature, and extend in a longitudinal and parallel relationship with one another. Each of the tubes 13 have their up-stream ends connect with non-perforate plate 10 such that gas cannot pass into an open end portion thereof. The down stream ends of tubes 13 connect with header 14 such that the accumulated contacted stream may be discharged through an outlet port 15 to the outlet nozzle 3. The perforations in the screens or plates 8 and 9 and tubes 13 may be round holes or elongated slots, etc., but, of course, shall be sized to preclude the passage of the catalyst particles which are to be used in the apparatus.

The present embodiment indicates the use of a separate tube-like member 14 extending laterally across the internal end portion of the catalyst retaining section between plates 8 and 9, however, a partitioning member may be used across the end of the catalyst zone between the upper and lower perforate plates 8 and 9 and between the side walls 4 and 5 such that there is a confined outlet header section formed in the housing without the use of a tubular member such as 14. Although not shown, suitable stiffening or positioning ribs may be utilized between the perforate plates 8 and 9 and the housing walls 6 and 7, as well as inside the catalyst retaining section between plates 7 and 8, such that the interior catalyst section is stabilized and held in proper positioning within the housing. The ribs or spacing members may be suitably designed and positioned to accommodate differential expansions between the inner plate sections and the outer walls of the housing due to any temperature differences encountered in the unit.

In the operation of the unit, an incoming exhaust gas stream passes through inlet nozzle 2 into the interior of housing 1 and is caused to be divided and passed into the respective manifold sections 11 and 12. From the latter the gas flow necessarily passes through the perforate plates 8 and 9 and into, respectively, the upper and lower portions of the catalyst bed 16 and thence into the plurality of collecting tubes 13. The treated gas stream collected by the plurality of tubes 13 flows from the header 14 and port 15 into the outlet nozzle 3. Inasmuch as the catalytic conversion of oxidizable components in the exhaust gas stream is of an exothermic nature the temperature of the perforate plate members 8 and 9, as well as tubes 13 and 14 within the catalyst retaining section, will be relatively high perhaps of the order of 1200° F. to 1800° F. after a continued operation. The temperature may be dependent upon the particular catalytic material employed as well as upon the operation of the particular vehicle, as to whether it is being operated under conditions of idle, acceleration, cruising or deceleration. Thus, the internal plate members and tubes are preferably of alloy construction capable of withstanding the high temperature conditions involved. It is also generally desirable to have the construction of the various components of the converter of a relatively light gauge sheet metal, i.e., for both the alloy and non-alloy sections, such that the weight of the converter will not be excessive and such that there may be expansion movement without effecting rupture or splitting of joints and seams.

As hereinbefore set forth, the perforations in the plate members 8 and 9 and in the tubular members 13 will, of course, be sized in relation to the size of the catalyst particles which are to be maintained within the apparatus. The physical shape of the catalyst particles may be such that they are in the form of spheres, cylinders or pellets, typically having a dimension of $\frac{1}{16}$-inch to about $\frac{1}{4}$-inch, although particles of larger or smaller dimensions may be employed, where desirable. Mixed sizes of catalysts may well be utilized. However, in loading the catalyst, care should be taken to be sure that the catalyst particles are uniformly packed in all portions of the bed to provide substantially uniform resistance to gas flow therethrough. It is not intended to limit the present invention to any one type of catalyst, but suitable oxidation catalysts include the metals of groups I, V, VI and VIII of the periodic table particularly copper, silver, vanadium, chromium, iron, cobalt, nickel and platinum. These componnets may be used singly, in combination of two or more, or may be composited with an inorganic refractory oxide such as alumina, silica-alumina, silica-alumina-zirconia, silica-thoria, silica-boria and the like.

It has also been found desirable to incorporate in catalytic converters a smaller percentage of active catalytic components or particles which will serve as an "igniter catalyst." In other words, the use of certain active catalysts which tend to initiate oxidation of oxidizable compounds in the gas stream flow at a relatively low temperature range and which range is lower than that of the bulk of the catalyst, will serve to initiate the operation of the whole catalyst bed at a lower temperature range as heat is transferred from the igniter catalyst particles to adjacent particles of the remaining portion of the catalyst bed. The present design of converter-muffler is especially and peculiarly adapted to make use of an igniter catalyst in combination with a perhaps less active or less expensive body of catalyst in the unit by virtue of using igniter catalyst particles of a different size or density than the major portion of the catalyst bed. For example, by selectively using igniter catalyst particles which are both larger and smaller than the bulk of the catalyst in bed 16, the larger particles will tend to float to the top of the bed and remain adjacent the upper perforate plate 8, while the smaller sized igniter particles will migrate to the lower portion of the bed and adjacent the lower perforate plate 9. This arrangement permits a desirable operation with igniter particles adjacent both inlet portions of the catalyst bed whereby the incoming gas flow will initially contact the particles of low temperature activity and in turn initiate catalytic conversion in the bed at a lower temperature than might otherwise be possible.

Referring now to FIGURE 3 of the drawing there is shown a modification of the converter-muffler where the manifold sections vary in cross sectional area in the direction of flow to provide means for obtaining a uniform space velocity through the catalyst section. A substantially symmetrical rectangular shaped box-like housing 17 is provided with an inlet end 18 having inlet nozzle 19 and an outlet end 20 having outlet nozzle 21. Positioned internally are spaced perforate screens or plates 22 and 23 which oppose respectively upper and lower walls 24 and 25 of the housing 17. As may be noted, the perforate members 22 and 23 slope or taper within the housing and away from the upper and lower wall sections 24 and 25 so as to form longitudinally tapering manifold sections 26 and 27 which decrease in cross sectional area from their upstream ends to their downstream ends. The perforate members 22 and 23 are positioned to join one another at their up-stream ends, or as shown in the drawing, become connected by a non-perforate plate member 28 such that the incoming gas flow through nozzle 19 will be split and caused to pass symmetrically into the manifold sections 26 and 27, with substantially equal portions passing upwardly and downwardly through the catalyst bed 29.

In a construction similar to that shown in FIGURES 1 and 2 a plurality of tubes or pipe sections 30 extend in parallel relationship longitudinally through the mid portion of the catalyst bed 29 and between plates 22 and 23. The down stream open end portions of the tubes 30 connect with a partitioning plate 31 which in turn bows or projects outwardly from the end wall portion 20 of housing 17 so as to form a confined header section 32 that communicates with outlet nozzle 21. The partitioning plate 31, like perforate plates 22 and 23, may be provided to extend laterally across the inside of the housing and connect with the side wall portions thereof so as to form the resulting separate header section 32. In order to maintain a desired uniform space velocity through the catalyst, the walls of the tubular members 30 are tapered to have their upper and lower segments extend substantially parallel with the respective perforate partitioning plates 22 and 23 such that the portion of the catalyst above the tubes, as well as that portion below the tubes, is substantially of a uniform thickness throughout the length and width of the unit. There is thus insured a uniform pressure drop for the gas flow through, respectively, the upper and lower portions of the bed.

The condition of uniform space velocity requires that the amount of gas diverted through the catalyst bed be directly proportional to the bed length measured from the inlet end. This proportional relationship is obtained if (1) the flow resistance across or through the catalyst is uniform, and (2) the up and down stream static pressures within the inlet and outlet manifold sections respectively, are substantially uniform. The first of the requirements is fulfilled in the present embodiment by having the perforations in the plates 22 and 23, and in tubular members 30, of substantially equal area and positioned uniformly throughout the length and width of the unit, as well as having the catalyst bed of a uniform thickness. In this instance, the portions of the catalyst bed above and below the bank of tubes 30 are substantially uniform throughout the length and width of the unit by virtue of having the tubular members slope in conformity with the angular positioning of plates 22 and 23. The second of the requirements is fulfilled by maintaining a linear gas velocity throughout the gas manifold sections such that there is no transition of velocity head to pressure head or of pressure head to velocity head in either manifold. It may be seen that this is accomplished by varying the longitudinal cross sectional area of the manifold sections, i.e., continually decreasing the cross sectional area of the inlet manifolds in the direction of the down stream flow while continually increasing the longitudinal cross sectional area of the gas outlet zone in the direction of the flow. Specifically, in the present embodiment, manifold sections 26 and 27 decrease in cross sectional area from the inlet end of the housing to the outlet end of the housing while conversely the tube members 30 increase in cross sectional area from the up stream ends to the down stream ends. In an operation where there is a substantial change in the volume of gases passing through the catalyst bed, either by virtue of molar changes brought about by chemical reactions or by temperature effects, or by both, it may be advantageous to compensate therefor by providing that the outlet manifold is larger in cross sectional area than the inlet manifold, while still retaining the varying cross sectional area aspect.

Various slight modifications may be made in the basic design of FIGURE 3 without deviating from the advantages obtained in the balanced flow through the catalyst section or in the uniform space velocity design which permits full utilization and efficient operation from the catalytic conversion zone. For example, the gas collecting header 32 may be formed by the use of a separate tubular member such as shown and described in connection with FIGURES 1 and 2. Also tubular members 30 may have a rectangular cross section rather than circular so as to provide substantially flat upper and lower surfaces to oppose the perforate catalyst retaining plates 22 and 23. In still another modification, the entire internal catalyst retaining section may be formed by horizontally positioned upper and lower perforate plates so as to provide a subsequently uniform rectangularly-shaped catalyst bed similar to that set forth in FIGURE 1 of the drawing, while the outer housing has upper and lower walls which slope or taper in the longitudinal direction with respect to the horizontally disposed perforate plates of the catalyst chamber such that variable cross-sectional area manifolds result above and below the catalyst section to accomplish the desired decreasing volumes in the direction of gas flow.

In many instances the variation of the cross sectional area in either the inlet manifold, or in the outlet manifold, will suffice to give a substantially uniform pressure drop and space velocity through the catalyst bed. However, where it is desired to have both the inlet and outlet manifolds vary in cross sectional area in the direction of flow, then in an embodiment which utilizes the taper wall sections in the outer housing, it is necessary to utilize tapering inserts or baffles within the interior of the perforate tubular members such that the gas outlet passageways increase in size in the direction of the flow of gas to the outlet end.

The drawings and descriptive matter in conjunction therewith have indicated that the flow through the unit is from the outside of the catalyst bed toward the inner tube bank, so as to obtain the desired balanced flow conditions, however, the apparatus design is such that flow may be effected in the reverse manner when considered desirable.

Still another structural modification may be incorporated, such as an access opening to the catalyst retaining section for the addition or removal of catalyst particles; or the use of tapered inlet and outlet sections to the housing, and the like, without varying from the concept of the present improved design.

The housing of the improved type of unit has been described herein as being of a generally flat rectangular box-like construction and will thus be generally rectangular in its plan and elevational views and have a generally rectangular lateral cross section. It is, however, entirely feasible to round off or bevel the corners of the housing, or to curve certain of the walls slightly, without deviating from the scope of the present invention which provides for a split inlet flow to pass both upwardly and downwardly within the unit through a catalyst bed which is designed and positioned to have a generally flat rectangular lateral cross section extending across the mid portion of the housing.

I claim as my invention:

1. A catalytic converter-muffler for treating an engine exhaust stream which comprises an outer housing of generally rectangular shape in transverse cross-section and having a gas inlet means at one end thereof and a gas outlet means at the opposing end thereof, an inner perforate particle-retaining chamber disposed within said housing and spaced symmetrically away from opposing walls thereof in a manner providing uniform gaseous flow to two sides of said perforate chamber, said chamber being rectangular in transverse cross-section and having an imperforate end facing the inlet end of the housing, a bank of perforate gas collecting pipes positioned side-by-side in relatively close parallel relationship in a single plane extending across the central portion of said inner chamber and parallel to said opposing walls, subdivided particulate catalytic material positioned uniformly on each side of said bank of pipes, each of the pipes of said bank having a closed upstream end and an open down stream end, each of the latter connecting with an outlet header extending laterally across the end portion of said inner chamber opposite said imperforate end thereof, and an outlet port from said header connecting with said gas outlet means from said housing.

2. A catalytic converter-muffler for treating an engine exhaust stream which comprises a relatively flat outer housing of rectangular shape in transverse cross-section and having gas inlet means at one end thereof and gas outlet means at the opposite end thereof, spaced perforate plates extending across the interior portion of said housing and forming within said housing a confined catalyst retaining chamber of rectangular shape in transverse cross-section, said chamber having a closed end facing the inlet end of the housing, said plates being spaced relatively close to opposing walls of said housing and symmetrical with respect to said walls in a manner providing symmetrically positioned and opposing manifold sections on opposite sides of said catalyst retaining chamber, gas passageway means from said gas inlet means to said manifold sections, a bank of perforate tubes positioned side-by-side in relatively close parallel relationship with one another and extending in one plane at the midportion of said catalyst retaining chamber and parallel to said opposing walls, subdivided particulate catalytic material positioned uniformly on each side of said bank of tubes in said chamber, each of said tubes of said bank having a closed end within said chamber facing the gas inlet end of said housing and an open end at the opposite end of the chamber, the open end of each of the tubes connecting with a gas outlet header extending laterally across said opposite end of said chamber, and an outlet port from said header connecting with said gas outlet means from said housing.

3. A catalytic converter-muffler for treating an exhaust gas stream which comprises a relatively flat outer housing of generally rectangular shape in transverse cross-section and having a gas inlet means at one end thereof and a gas outlet means at the opposing end thereof, a pair of spaced perforate partitioning plates positioned within said housing and forming therein a catalyst retaining section of rectangular shape in cross-section, said catalyst retaining section having a closed end facing the inlet end of the housing, each of said plates being positioned in sloping relationship with respect to an adjacent and opposing wall section of said housing in a manner to form similar and opposing manifold sections, with each such manifold section having a variable cross-sectional area throughout the length thereof adjacent each side of said catalyst retaining section, a bank of perforate tubes positioned side-by-side in parallel relationship with one another in a single plane extending across the central interior portion of said catalyst retaining section and parallel to the opposing wall sections of the housing, said tubes having closed ends facing the gas inlet end of the housing and having exterior walls shaped to have segments thereof extend substantially parallel with said pair of spaced perforate plates, catalyst particles positioned in a uniform depth on each side of said bank of tubes in said catalyst section, each of said tubes of said bank connecting with a gas header extending laterally across the end of said catalyst retaining section opposite said closed end of the catalyst retaining section, and said header connecting with said gas outlet means from said housing.

References Cited in the file of this patent

UNITED STATES PATENTS

| | | |
|---|---|---|
| 1,709,333 | Webb | Apr. 16, 1929 |
| 1,811,762 | Schnell | June 23, 1931 |
| 2,185,584 | Boyce | Jan. 2, 1940 |
| 2,329,847 | McCausland | Sept. 21, 1943 |
| 2,614,033 | Cornell et al. | Oct. 14, 1952 |
| 2,635,989 | Bonner | Apr. 21, 1953 |
| 2,639,224 | McAfee | May 19, 1953 |
| 2,777,759 | Sokolik | Jan. 15, 1957 |
| 3,024,593 | Houdry | Mar. 13, 1962 |
| 3,041,149 | Houdry | June 26, 1962 |